Jan. 8, 1929.

J. S. HUNTER 1,698,194

POWER TRANSMITTER

Filed March 26, 1926   2 Sheets-Sheet 1

J. S. Hunter
Inventor,

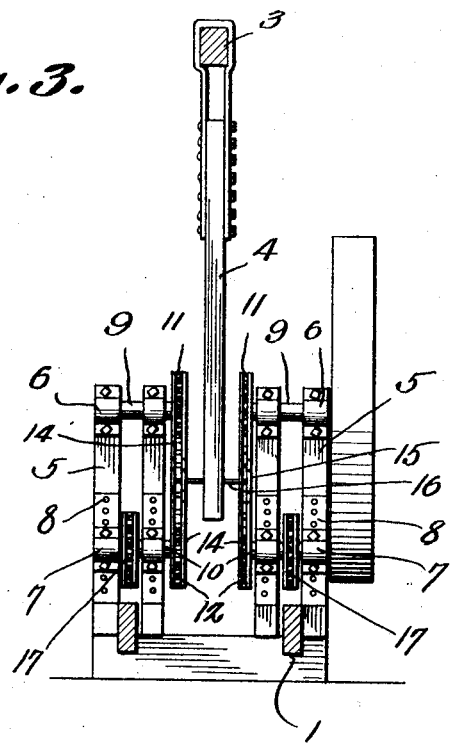

Patented Jan. 8, 1929.

1,698,194

UNITED STATES PATENT OFFICE.

JOHN SAMUEL HUNTER, OF COALINGA, CALIFORNIA.

POWER TRANSMITTER.

Application filed March 26, 1926. Serial No. 97,641.

This invention aims to provide novel means whereby the throw of a walking beam may be adjusted, it being possible to give an unusually long throw to the walking beam, without rendering it necessary to resort to a long and cumbersome crank, and the direction of vertical travel being reversed quickly.

Figure 1:
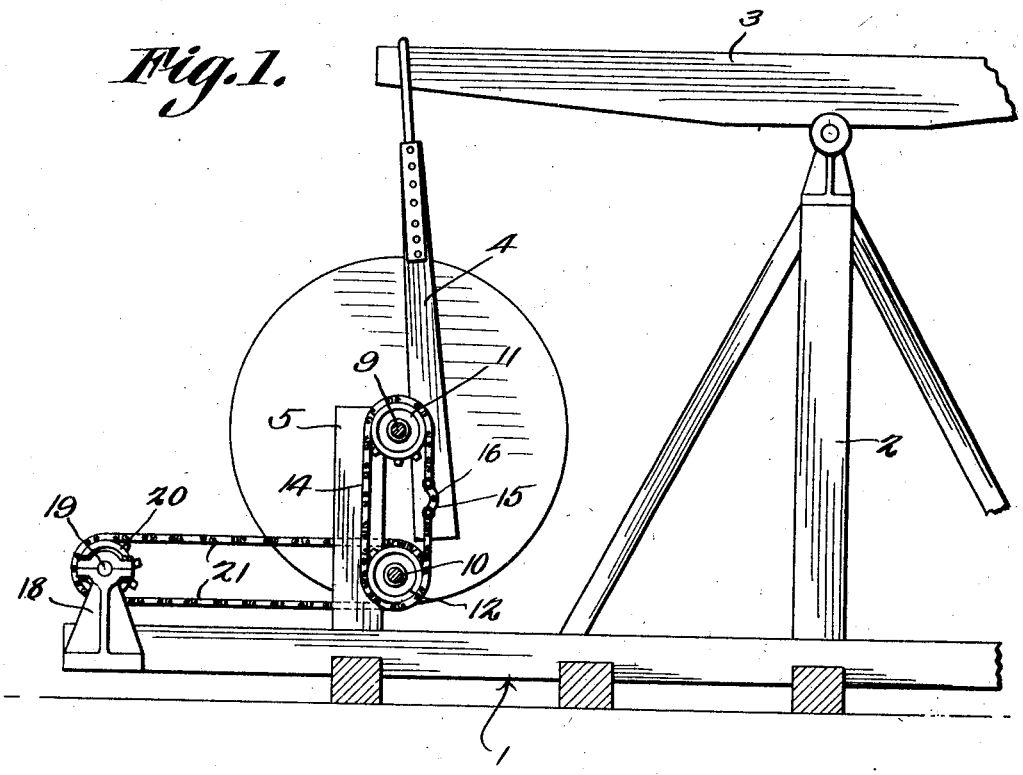
Figure 2:
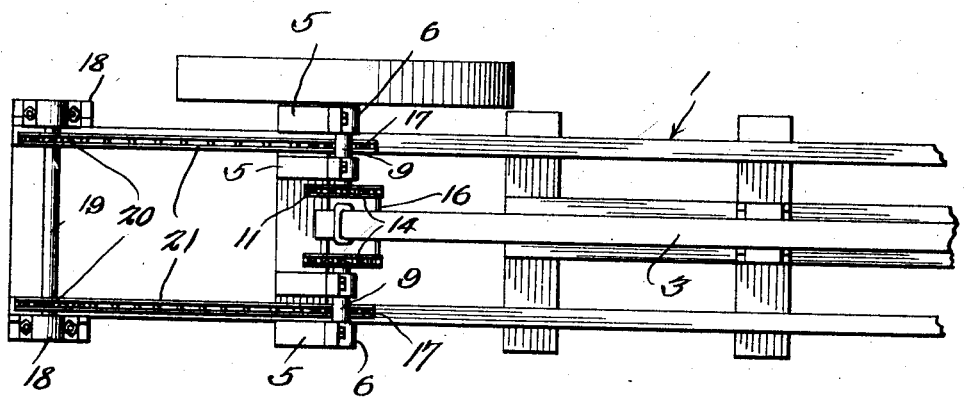

Figure 1 is a side elevation; Figure 2 is a top plan; Figure 3 is a cross section; Figure 4 is an elevation of a part of one of the chains.

Although the device may be made in various ways, but one form has been shown in the drawings, it being understood that a mechanic, working within the scope of what is claimed, may make such changes as his skill may suggest, without departing from the spirit of the invention.

In the drawings, there is provided a frame 1 on which is mounted a support 2 whereon a walking beam 3 is fulcrumed intermediate its ends. The upper end of a depending pitman 4 is pivotally connected to one end of the walking beam 3.

Posts 5 are erected on the frame 1 and form part thereof. Bearings 6 are mounted on the upper ends of the posts 5. Bearings 7 are mounted on the posts 5 near to the lower end thereof. Any suitable means 8 may be provided, whereby the bearings 7 may be adjusted vertically on the posts 5, toward and away from the bearings 6. Shafts 9 are journaled in the bearings 6. Shafts 10 are journaled in the bearings 7. Sprocket wheels 11 are mounted on the inner ends of the shafts 9. Sprocket wheels 12 are mounted on the inner ends of the shafts 10. About the sprocket wheels 11 and 12 are engaged sprocket chains 14. The chains 14 include outwardly bowed links 15. The links 15 are connected by a cross member 16, preferably a rod. The lower end of the pitman 4 is mounted pivotally on the cross member or rod 16. The posts 5 are disposed in pairs, as shown in Figure 3. Sprocket wheels 17 are mounted on the shafts 10 between the posts of the pairs. Standards 18 are erected on the frame 1. A shaft 19 is journaled in the standards 18 and carries sprocket wheels 20. Sprocket chains 21 are engaged with the sprocket wheels 20 and with the sprocket wheels 17.

When rotation is imparted to the shaft 19, the sprocket wheels 20 and the chains 21 rotate the sprocket wheels 17, the chains 14 being operated, and the cross member 16 being caused to move in an orbit which is greatly elongated vertically, as compared with its horizontal dimension. The result is that the pitman 4 gets a long throw, without resorting to the use of a long crank, and, furthermore, the amount of horizontal movement which the cross member 16 has is very small, and that movement takes place quickly, the cross member 16 being moved vertically, either upwardly or downwardly, throughout a large proportion of the time that any motion is imparted to it.

In order to change the throw of the walking beam 3, the lower bearings 7 may be adjusted vertically by the means shown at 8, and the chains 14 may be replaced by other chains of a different length.

The bowed links 15 accomplish at least two useful ends: First, whilst the chains 14 are moving around the sprocket wheels 11 and 12, the links 15 hold the rod 16 away from the periphery of each of the sprocket wheels, and there is no chance that the rod will strike on the ends of the teeth of any of the sprocket wheels and cause the chains to jump off the sprocket wheels. Second, because the links 15 are bowed, when the links 15 travel around the sprocket wheels 11 and 12, the vertical component in the movement of the pitman 4 is increased over what it would be if the links 15 were replaced by straight links which lay close to the peripheries of the wheels 11 and 12 as the links moved over the peripheries of the wheels.

What is claimed is:—

In a device of the class described, transversely spaced sprocket wheels, having teeth, sprocket chains about the sprocket wheels and including links cooperating with the teeth of the sprocket wheels, a transverse connection extended between the chains and mounted on divers links of the chains, and a machine part mounted on the connection, the device being characterized by this: that the links whereon the connection is mounted, are bowed outwardly, to the end that the connection may not strike the teeth of the sprocket wheels when the bowed links move over the peripheries of the sprocket wheels, and to the end that, as the bowed links move over the peripheries of the sprocket wheels, the throw imparted to the machine part, by the connection, may be increased.

In testimony that I claim the foregoing as my own, I have hereto affixed my signature.

JOHN SAMUEL HUNTER.